US012069601B2

(12) United States Patent
Chen et al.

(10) Patent No.: US 12,069,601 B2
(45) Date of Patent: *Aug. 20, 2024

(54) ASYNCHRONOUS CA HANDLING

(71) Applicant: QUALCOMM Incorporated, San Diego, CA (US)

(72) Inventors: Wanshi Chen, San Diego, CA (US); Shimman Arvind Patel, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/654,780

(22) Filed: Mar. 14, 2022

(65) Prior Publication Data
US 2022/0201635 A1 Jun. 23, 2022

Related U.S. Application Data

(63) Continuation of application No. 15/664,551, filed on Jul. 31, 2017, now Pat. No. 11,304,164.
(Continued)

(51) Int. Cl.
*H04W 56/00* (2009.01)
*H04J 11/00* (2006.01)
(Continued)

(52) U.S. Cl.
CPC ..... *H04W 56/0035* (2013.01); *H04J 11/0053* (2013.01); *H04L 5/0005* (2013.01);
(Continued)

(58) Field of Classification Search
CPC ......... H04W 56/0035; H04W 56/0005; H04W 56/0015; H04W 72/21; H04W 72/23;
(Continued)

(56) References Cited

U.S. PATENT DOCUMENTS

2011/0170418 A1 7/2011 Saagfors et al.
2011/0176483 A1 7/2011 Palanki et al.
(Continued)

FOREIGN PATENT DOCUMENTS

WO WO-2013112320 A1 8/2013

OTHER PUBLICATIONS

International Preliminary Report on Patentability—PCT/US2017/062072, The International Bureau of WIPO—Geneva, Switzerland, May 31, 2019.
(Continued)

*Primary Examiner* — Jasper Kwoh
(74) *Attorney, Agent, or Firm* — QUALCOMM Incorporated

(57) ABSTRACT

Handling of asynchronous multi-carrier is discussed. In new radio (NR) fifth generation (5G) networks, the potential for provision of multi-carrier operations (e.g., carrier aggregation (CA), dual connectivity (DC), etc.) that include asynchronous component carriers (CCs) has been proposed. However, because of the asynchronous relationship network entities, such as base stations and user equipments (UEs) will manage the asynchronous CCs by obtaining timing offset information, either through derivation or direct signaling, and determining a subframe correspondence based on the timing offset relative to a reference CC. By determining the subframe correspondence to the reference CC, the base stations and UEs can accurately map communications over the asynchronous CCs to the appropriate subframes across CCs.

20 Claims, 11 Drawing Sheets

Related U.S. Application Data

(60) Provisional application No. 62/424,182, filed on Nov. 18, 2016.

(51) Int. Cl.
*H04L 5/00* (2006.01)
*H04L 27/26* (2006.01)
*H04W 52/14* (2009.01)
*H04W 72/21* (2023.01)
*H04W 72/23* (2023.01)

(52) U.S. Cl.
CPC ............ *H04L 5/001* (2013.01); *H04L 5/0044* (2013.01); *H04L 27/2656* (2013.01); *H04W 52/146* (2013.01); *H04W 56/0005* (2013.01); *H04W 56/0015* (2013.01); *H04W 72/21* (2023.01); *H04W 72/23* (2023.01)

(58) Field of Classification Search
CPC . H04W 52/146; H04J 11/0053; H04L 5/0005; H04L 5/001; H04L 5/0044; H04L 27/2656
See application file for complete search history.

(56) References Cited

U.S. PATENT DOCUMENTS

| | | |
|---|---|---|
| 2011/0212693 A1 | 9/2011 | Sagfors et al. |
| 2012/0213190 A1* | 8/2012 | Yoon .................. H04L 27/2613 370/328 |
| 2012/0243498 A1* | 9/2012 | Kwon .................. H04L 5/0053 370/328 |
| 2013/0195084 A1 | 8/2013 | Chen et al. |
| 2013/0308550 A1 | 11/2013 | Yin et al. |
| 2014/0241265 A1 | 8/2014 | Pragada et al. |
| 2014/0369294 A1 | 12/2014 | Seo et al. |
| 2015/0103782 A1 | 4/2015 | Xu et al. |
| 2016/0192376 A1 | 6/2016 | Lee et al. |
| 2016/0242158 A1 | 8/2016 | Takeda et al. |
| 2017/0134144 A1 | 5/2017 | Lunttila et al. |
| 2017/0135101 A1 | 5/2017 | Li et al. |
| 2017/0142668 A1 | 5/2017 | Takeda et al. |
| 2017/0164311 A1 | 6/2017 | Lee et al. |
| 2017/0303182 A1 | 10/2017 | Uchino et al. |
| 2018/0048430 A1 | 2/2018 | Wu |
| 2018/0062776 A1 | 3/2018 | Teshima et al. |
| 2018/0132260 A1 | 5/2018 | Harada et al. |
| 2018/0146444 A1 | 5/2018 | Chen et al. |
| 2018/0213489 A1 | 7/2018 | Andou et al. |

OTHER PUBLICATIONS

International Search Report and Written Opinion—PCT/US2017/062072—ISA/EPO—Apr. 11, 2018.
Partial International Search Report—PCT/US2017/062072—ISA/EPO—Feb. 21, 2018.
Taiwan Search Report—TW106139650—TIPO—Jan. 22, 2021.

* cited by examiner

ASYNCHRONOUS CA HANDLING

CROSS-REFERENCE TO RELATED APPLICATIONS

This application is a continuation of and claims priority to U.S. patent application Ser. No. 15/664,551, entitled, "ASYNCHRONOUS CA HANDLING," filed on Jul. 31, 2017, and claims the benefit of U.S. Provisional Patent Application No. 62/424,182, entitled, "ASYNCHRONOUS CA HANDLING," filed on Nov. 18, 2016, both of which are expressly incorporated by reference herein in their entirety.

BACKGROUND

Field

Aspects of the present disclosure relate generally to wireless communication systems, and more particularly, to asynchronous carrier aggregation handling.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes detecting, by a UE, a multi-carrier operation including a plurality of asynchronous component carriers (CCs), obtaining, by the UE, a timing offset between the plurality of asynchronous CCs, determining, based on the timing offset, a subframe correspondence relative to a reference CC of the plurality of asynchronous CCs, and mapping communications between the UE and one or more serving base stations to one or more subframes on the plurality of asynchronous CCs based on the determined subframe correspondence.

In an additional aspect of the disclosure, an apparatus configured for wireless communication includes means for detecting, by a UE, a multi-carrier operation including a plurality of asynchronous component carriers (CCs), means for obtaining, by the UE, a timing offset between the plurality of asynchronous CCs, means for determining, based on the timing offset, a subframe correspondence relative to a reference CC of the plurality of asynchronous CCs, and means for mapping communications between the UE and one or more serving base stations to one or more subframes on the plurality of asynchronous CCs based on the determined subframe correspondence.

In an additional aspect of the disclosure, a non-transitory computer-readable medium having program code recorded thereon. The program code further includes code to detect, by a UE, a multi-carrier operation including a plurality of asynchronous component carriers (CCs), code to obtain, by the UE, a timing offset between the plurality of asynchronous CCs, code to determine, based on the timing offset, a subframe correspondence relative to a reference CC of the plurality of asynchronous CCs, and code to map communications between the UE and one or more serving base stations to one or more subframes on the plurality of asynchronous CCs based on the determined subframe correspondence.

In an additional aspect of the disclosure, an apparatus configured for wireless communication is disclosed. The apparatus includes at least one processor, and a memory coupled to the processor. The processor is configured to detect, by a UE, a multi-carrier operation including a plurality of asynchronous component carriers (CCs), code to obtain, by the UE, a timing offset between the plurality of asynchronous CCs, code to determine, based on the timing offset, a subframe correspondence relative to a reference CC of the plurality of asynchronous CCs, and code to map communications between the UE and one or more serving base stations to one or more subframes on the plurality of asynchronous CCs based on the determined subframe correspondence.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
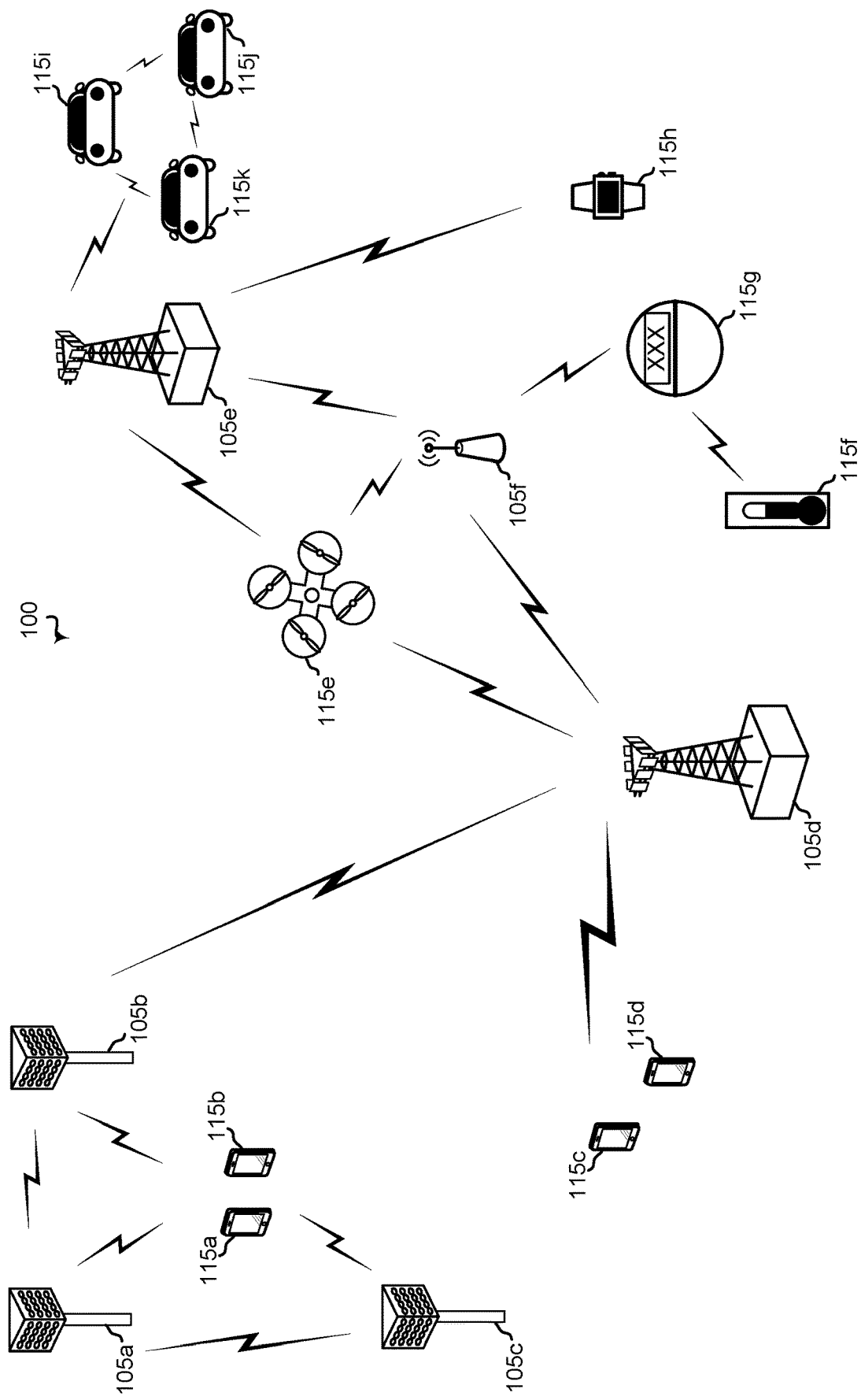
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of a new radio (NR) technology. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs allows transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. 5G network 100 may also provide additional network efficiency through dynamic, low-latency TDD/FDD communications, such as in a vehicle-to-vehicle (V2V) mesh network between UEs 115*i*-115*k* communicating with macro base station 105*e*.

Figure 2:
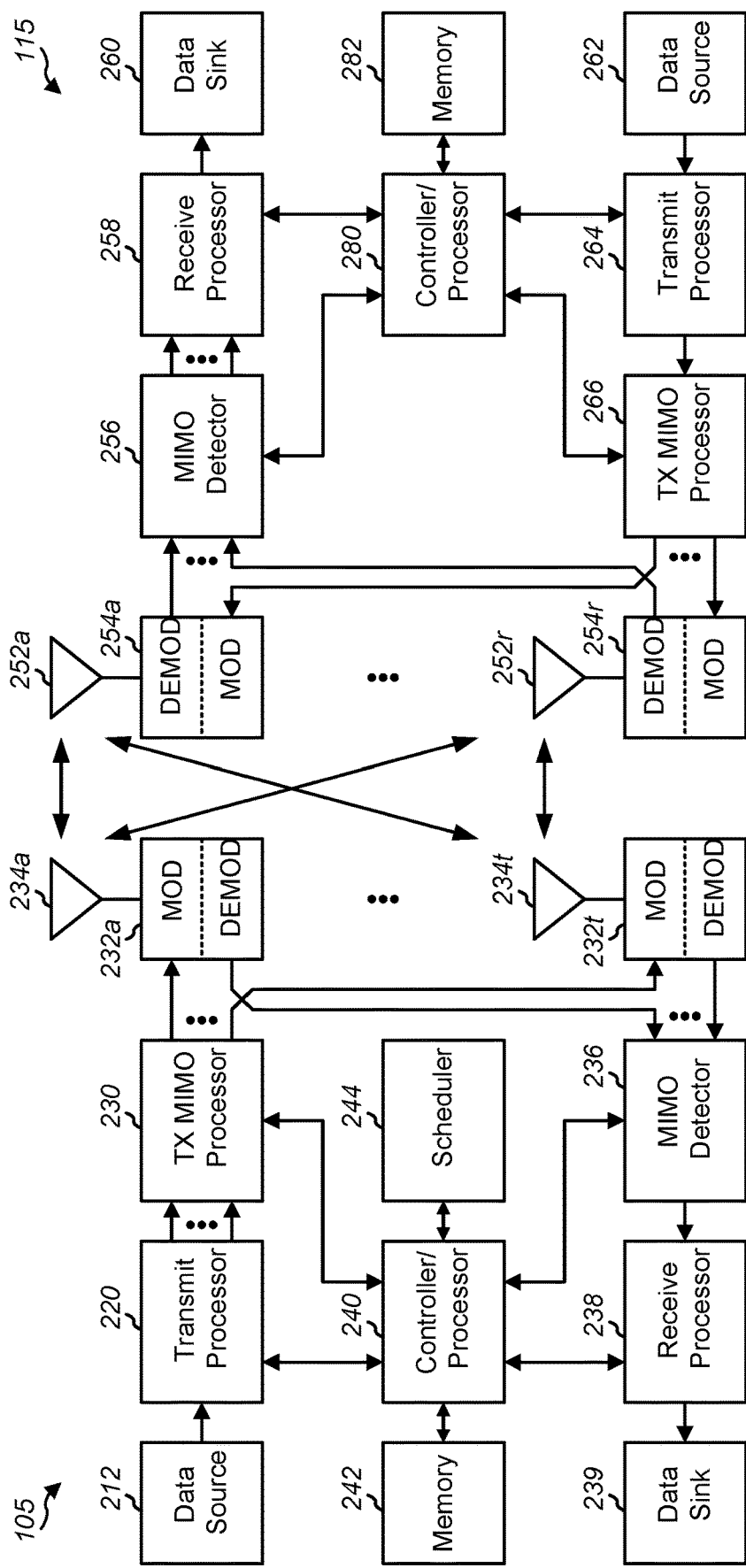
FIG. 2 is a block diagram illustrating a design of a base station and a UE configured according to one aspect of the present disclosure.

FIG. 2 shows a block diagram of a design of a base station 105 and a UE 115, which may be one of the base stations and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a* through 232*t*. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232*a* through 232*t* may be transmitted via the antennas 234*a* through 234*t*, respectively.

At the UE 115, the antennas 252*a* through 252*r* may receive the downlink signals from the base station 105 and may provide received signals to the demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254*a* through 254*r*, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254*a* through 254*r* (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 4 and 9, and/or other processes for the techniques described herein. The memories 242 and 282 may store data and program codes for the base station 105 and the UE 115, respectively. A scheduler 244 may schedule UEs for data transmission on the downlink and/or uplink.

LTE supports a range of multi-carrier operations, including carrier aggregation (CA) and dual-connectivity (DC). CA provides a set of component carriers (CCs), in which the CCs are connected with a "ideal" backhaul, where "ideal" means a very small latency and a very large backhaul bandwidth. In contrast, DC provide multiple groups of CCs, in which, within each group, the set of CCs are similar to CA, but where the multiple groups are connected with a non-ideal backhaul connection, meaning that there is some latency, and/or a limited backhaul bandwidth. LTE also supports multiple different types of frame structures. The set of CCs operating in CA or DC may have multiple different types of frame structure. For example, CCs may be configured with frame structure 1 (FS1) with frequency divisional duplex (FDD) CCs; with frame structure 2 (FS2) for time division duplex (TDD) CCs, or with a combination of frame structures 1, 2, and the unlicensed spectrum of frame structure 3 (FS3). The LTE TDD CCs may also be of the same or different TDD uplink/downlink subframe configurations. In LTE implementations, the CCs in CA or within each group of DC are generally synchronous, while the two groups in DC can be asynchronous. The UE perspective provides a maximum downlink reception timing difference among CCs of 31 μs, and a maximum uplink transmission timing difference among CCs of 31 μs.

Research and planning for new radio (NR) (5G) operations have suggested communications with potential resources of up to and including a 1 GHz contiguous spectrum from both the network and UE perspectives, including a maximum single carrier bandwidth of at least 80 MHz. Discussions surrounding NR 5G have also suggested support for carrier aggregation and dual-connectivity. The maximum bandwidth supported by some UE capabilities/categories may be less than maximum channel bandwidth of the serving single carrier in NR, while other UEs would include capabilities/categories that may support channel bandwidth of the entire maximum single serving carrier.

Figure 3:
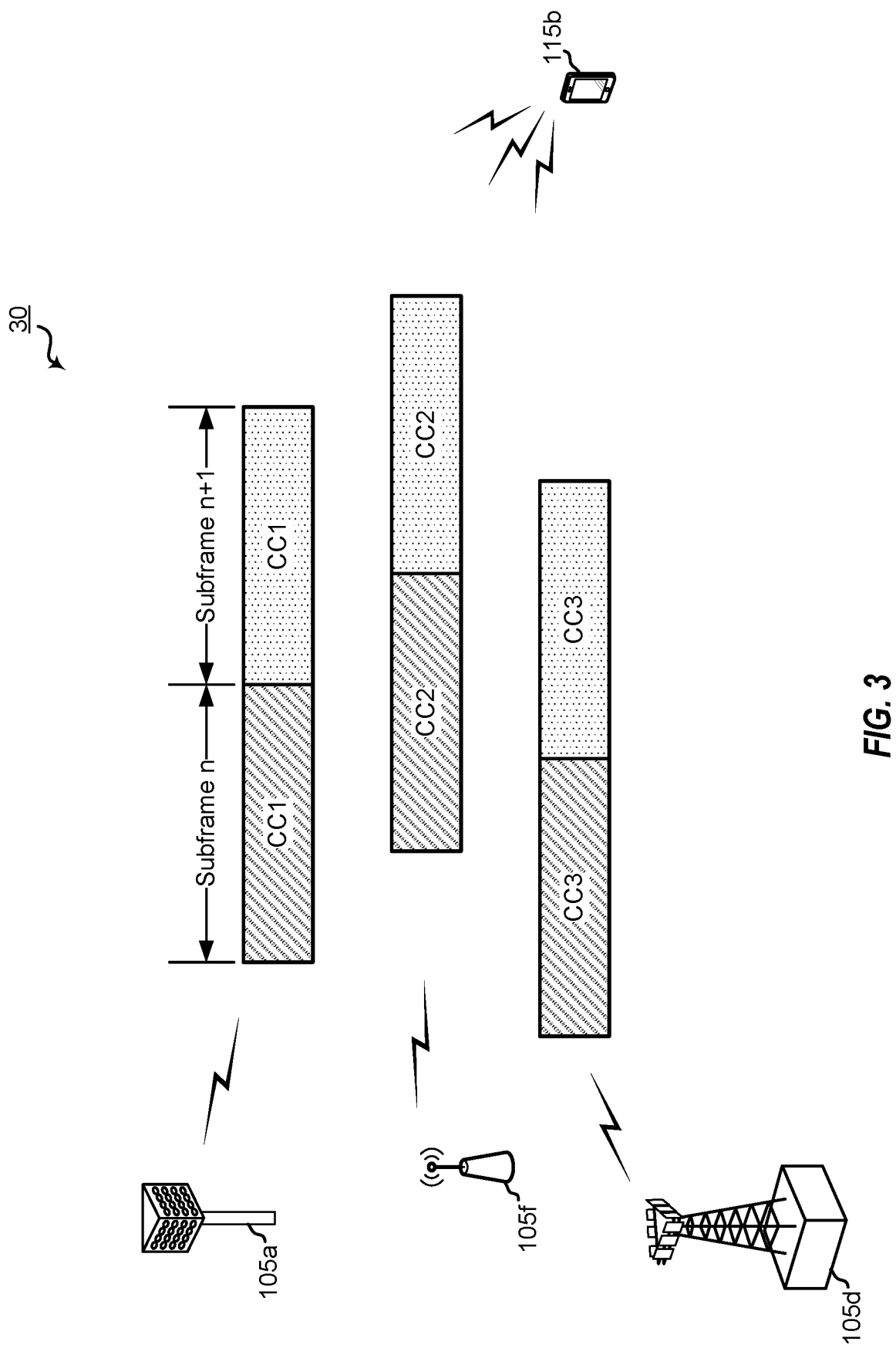
FIG. 3 is a block diagram illustrating an NR network configured with asynchronous CCs for multi-carrier operations.

FIG. 3 is a block diagram illustrating an NR network 30 configured with asynchronous CCs for multi-carrier operations. The portion of NR network 30 illustrated in FIG. 3 includes base stations 105*a*, 105*f*, and 105*d*, of different power classes serving within a multi-carrier operations set to UE 115*b*. Base station 105*a* serves CC1, base station 105*f* serves CC2, and base station 105*d* serves CC3 for the multi-carrier operations with UE 115*b*. As illustrated, each of CC1-CC3 are asynchronous to one another. Communications over CC1-CC3 are divided into subframes that, according to the multi-carrier operation, may include transmissions of the same or coordinating data between base stations 105*a*, 105*f*, and 105*d*, and UE 115*b* as a part of the communication efficiency of the multi-carrier operation.

However, because each of CC1-CC3 are asynchronous, issues may arise managing the communications carried on each individual CC.

CC1 would include either or both of control and data packets transmitted from base station 105a in subframes n and n+1. The multi-carrier operations may also define control and/or data related to the control and data transmitted in CC1 in subframes n and n+1 to be transmitted concurrently in related subframes of CC2 and CC3. However, for purposes of decoding or hybrid automatic repeat requested (HARQ) operations, with the asynchronous nature between CC1-CC3, it may be difficult for UE 115b to correctly map the received control or data packets from their individual subframes of the asynchronous CCs to the related control or data packets from the other CCs. Accordingly, various aspects of the present disclosure are directed to management of asynchronous multi-carrier operations.

Figure 4:
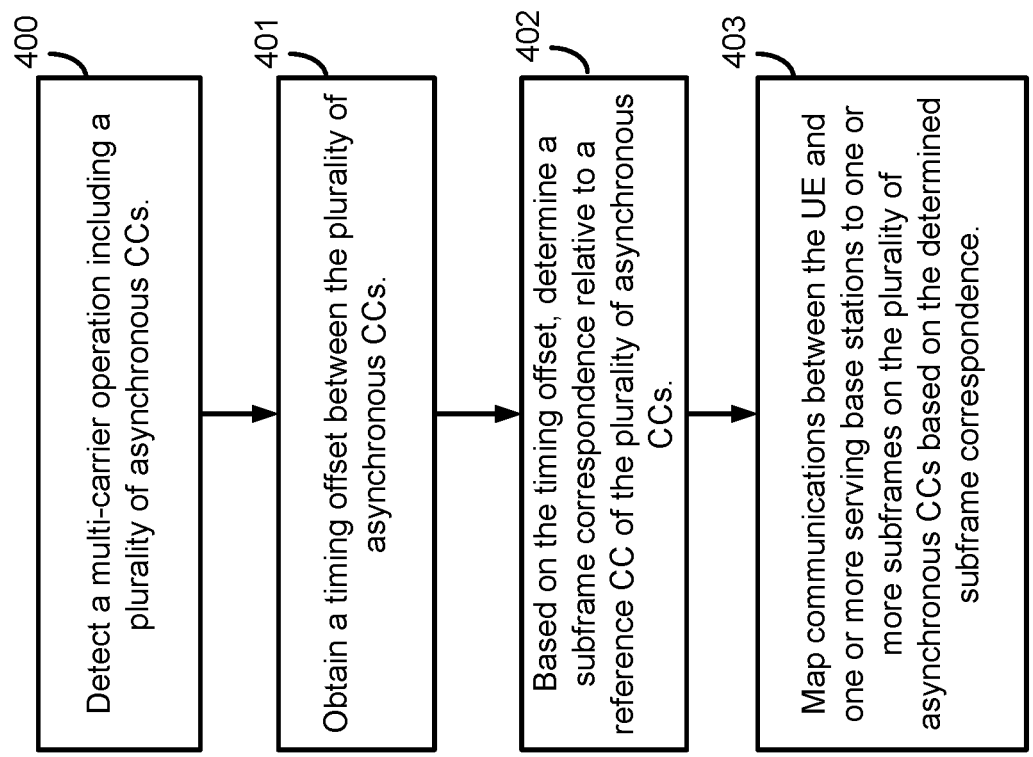
FIG. 4 is a block diagram illustrating example blocks executed to implement one aspect of the present disclosure.
Figure 10:
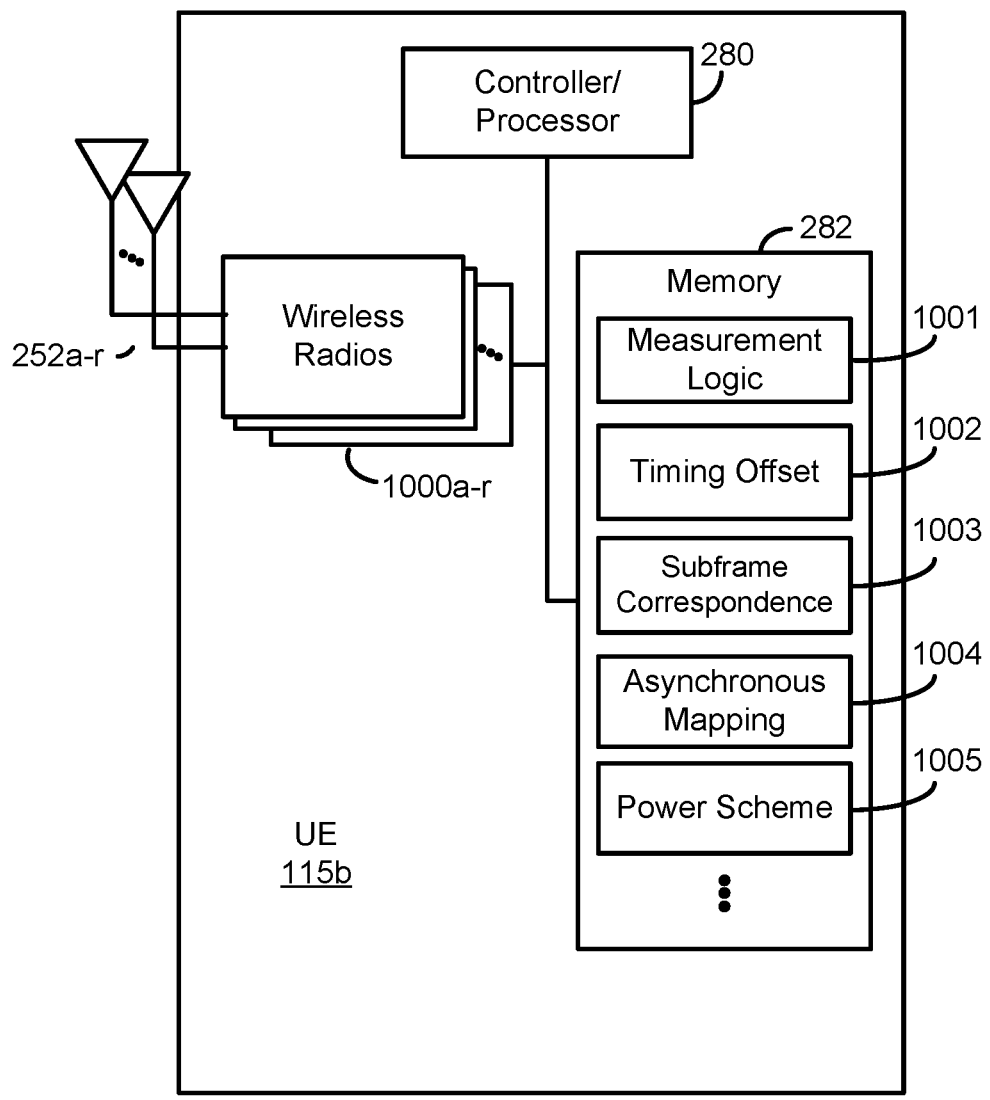
FIG. 10 is a block diagram illustrating a UE configured according to one aspect of the present disclosure.

FIG. 4 is a block diagram illustrating example blocks executed to implement one aspect of the present disclosure. The example blocks will also be described with respect to UE 115b, as illustrated in FIG. 10. FIG. 10 is a block diagram illustrating UE 115b configured according to one aspect of the present disclosure. UE 115b includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1000a-r and antennas 252a-r. Wireless radios 1000a-r include various components and hardware, as illustrated in FIG. 2 for UE 115, including demodulators/modulators 254a-r, MIMO detector 256, receive processor 258, transmit processor 264, and TX MIMO processor 266.

At block 400, a UE detects a multi-carrier operation including a plurality of asynchronous CCs. The multi-carrier operation could be CA, DC, and the like.

At block 401, the UE obtains a timing offset between the plurality of asynchronous CCs. In order to obtain the timing offset, the UE, such as UE 115b may either derive the offset by deriving other characteristics of the signaling, such as the symbol timing, subframe timing, and system frame number (SFN) from measurement or decoding of PSS, SSS, and PBCH of each CC. For example, under control of controller/processor 280, UE 115b executes measurement logic 1001, stored in memory 282, to measure the symbol timing, subframe timing, and obtain the SFN from PSS, SSS, and PBCH transmitted for each of the CCs. UE 115b would then determine and store the offset at timing offset 1002 in memory 282. Alternatively, the NR network may be configured for serving base stations to include the timing offset between other base stations in a multi-carrier operation set as system information either broadcast or semi-statically communicated to any UEs being served by the multi-carrier operation set of base stations. Thus, UE 115b would receive the indication of the offset to be stored at timing offset 1002 via antennas 252a-r and wireless radios 1000a-r.

At block 402, the UE determines a subframe correspondence, based on the timing offset, relative to a reference CC of the plurality of asynchronous CCs. For example, UE 115b would execute subframe correspondence logic 1003, stored in memory 282, under control of controller/processor 280, in order to determine the subframe correspondence based on the offset stored at timing offset 1002. One of the CCs may be indicated as the primary cell (Pcell) or anchor PUCCH cell for communicating HARQ processes. This Pcell or anchor PUCCH cell would be identified as the reference CC. Using the timing offset, UE 115b would determine the subframe correspondence or relational orientation of each subframe of a CC with respect to the reference CC.

At block 403, the UE maps communications between the UE and the one or more serving base stations to one or more subframes on the plurality of asynchronous CCs based on the determined subframe correspondence. For example, UE 115b, under control of controller/processor 280, would execute asynchronous mapping logic 1004, stored in memory 282, to map the communications to the appropriate subframe relationship. With the subframe correspondence determined, UE 115b would know which subframe of the secondary cells (Scells) CCs corresponded to subframe n, subframe n+1, and the like. Therefore, the communication packets in each such subframe may be mapped by UE 115b for correct processing with the other related communication packets of the asynchronous CCs.

Figure 5:
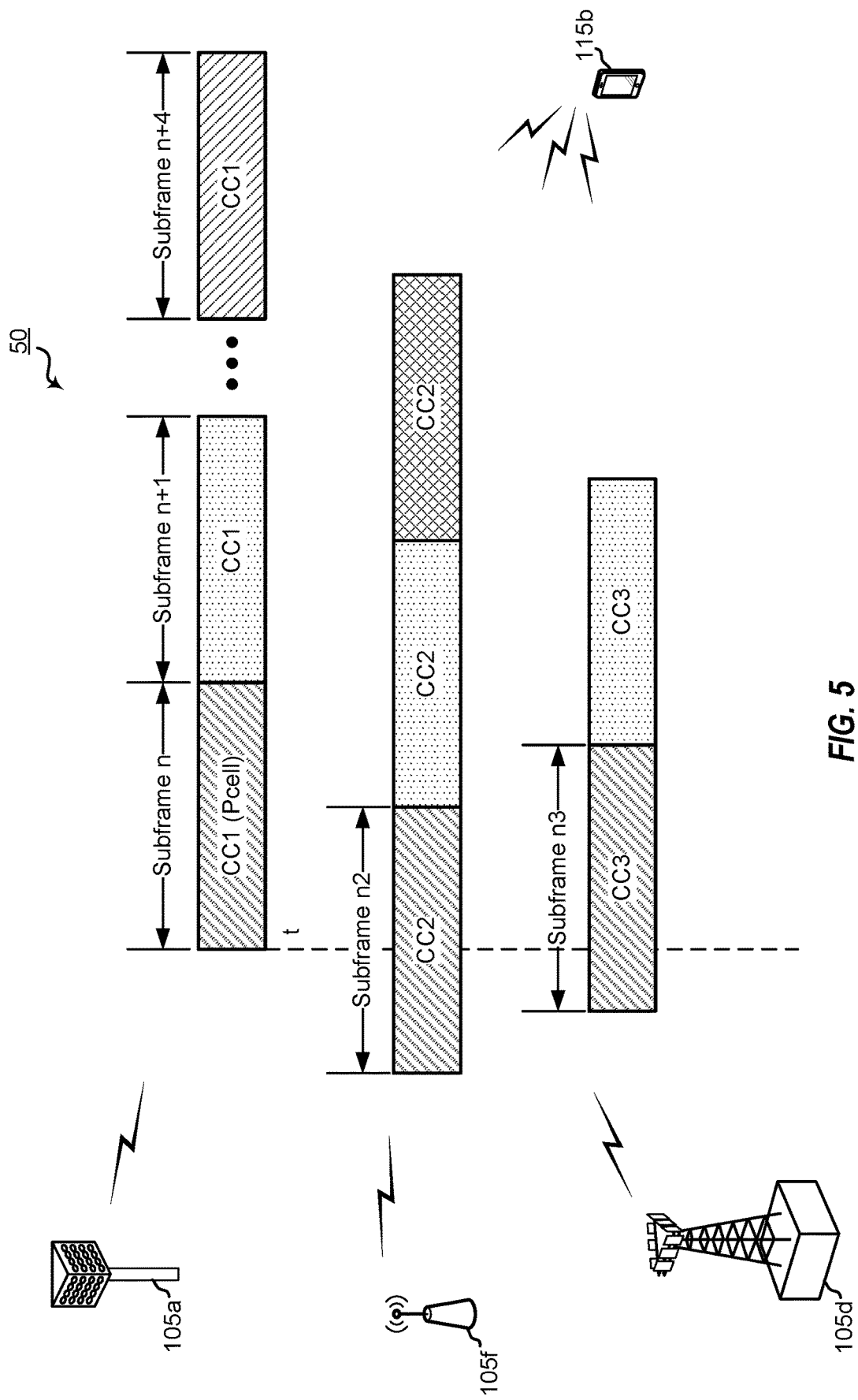
FIG. 5 is a block diagram illustrating an NR network configured according to one aspect of the present disclosure.

FIG. 5 is a block diagram illustrating NR network 50 configured according to one aspect of the present disclosure. Base stations 105a, 105f, and 105d are part of an operational set configured for multi-carrier operations with UE 115b. Control and/or data packets are communicated on each of CC1-CC3 in a coordinated fashion in order to efficiently transmit data between base stations 105a, 105f, and 105d, and UE 115b. In order to manage the asynchronous CCs of this multi-carrier operation (e.g., CA, DC, and the like operations), a UE, such as UE 115b when indicated or configured with asynchronous multi-carrier operations, can derive the symbol timing, subframe timing, and SFN from the PSS, SSS, and PBCH transmitted for each of CC1-CC3. Thus, UE 115b may derive the timing offset among CC1-CC3 by detecting the timing information for each CC and calculating the timing offset.

In alternative aspects, either one or all of base stations 105a, 105f, and 105d may directly communicate an indication of the timing offset among CC1-CC3 to UE 115b, through broadcast or unicast transmissions. For example, the SFN offset may be communicated, without the need to decode PBCH for some CCs. Based on the relative timing offset, UE 115b can derive or be provided with information regarding how the multi-carrier operation among the asynchronous CCs, CC1-CC3, are configured based on a reference CC (e.g., a Pcell CC, or a PUCCH CC) in terms of a subframe correspondence. CC1 may be identified by UE 115b as the Pcell of the multi-carrier operational set. Thus, the subframe correspondence of the subframes of CC2 and CC3 is relative to the reference subframe of CC1. For example, for subframe n of the reference CC1, the corresponding subframes for other CC2 and CC3 of the multi-carrier operational set for the same HARQ feedback would be represented as subframe nk for the kth CC, where subframe nk has a starting time prior to the starting time of subframe n of the HARQ subframe in order to have enough time for processing HARQ feedback.

As illustrated in FIG. 5, subframe n of CC1 starts at time, t. With a standard HARQ timing, in order to share the same HARQ feedback operation, the starting time of subframe n2 (of CC2) and n3 (of CC3) is prior to the starting time, t, of CC1 in order to process received signals prior to the HARQ feedback subframe (subframe n+4). As such, as illustrated in FIG. 5, UE 115b may determine the subframe correspondence (either through an indication of the timing offset directly from base stations 105a 105f, and 105d, or by deriving the timing offset from synchronization and broadcast signals on each of CC1-CC3) and, in relation to the Pcell (CC1) may determine each subframe in CC2 and CC3 that are related to subframe n. Accordingly, UE 115*b* would schedule acknowledgement transmission for subframe n, n2, and n3, at subframe n+4.

Figure 11:
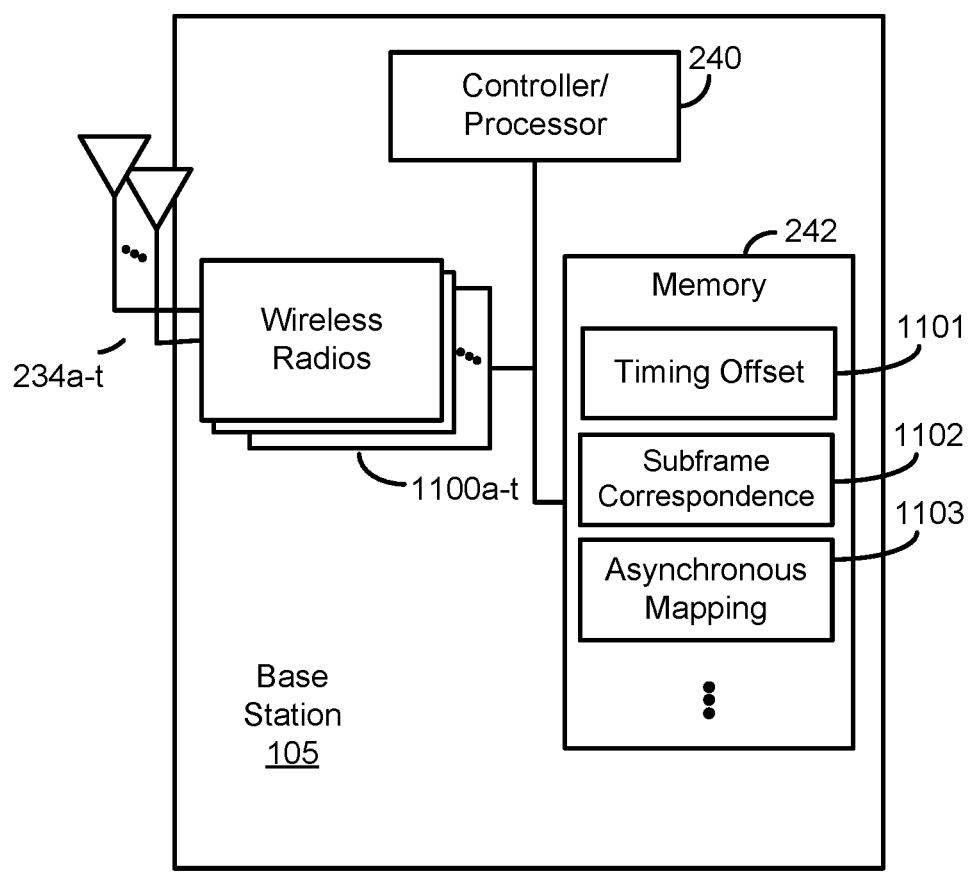
FIG. 11 is a block diagram illustrating a base station configured according to one aspect of the present disclosure.

It should be noted that each of base stations 105*a*, 105*f*, and 105*d* also derive the subframe correspondence of the transmissions, both the downlink transmissions that they provide to UE 115*b*, and also any uplink transmissions that are transmitted according to the multi-carrier operations. Thus, both the transmitting and receiving network entities would correctly map the transmitted packets in the communications between them. FIG. 11 is a block diagram illustrating a base station 105 configured according to one aspect of the present disclosure. Similar to the operations of UE 115*b* (FIG. 10), base station 105, under control of controller/processor 240, would calculate and store offsets in timing offset 1100. These offsets may be used only by base station 105, or, in alternative aspects, may be directly transmitted from base station 105 to a served UE. Under control of controller/processor 240, base station 105 executes subframe correspondence logic 1101, which, using the offset stored at timing offsets 1100, derive the correspondence of the subframes between the reference CC of the multi-carrier operations set and the secondary CCs. Execution of asynchronous mapping logic 1102, stored in memory 242, would use the subframe correspondence to correctly map communications to and from the served UEs. Thus, on both the UE and base station sides, asynchronous CCs within multi-carrier operations may be accurately managed and maintained.

Figure 6:
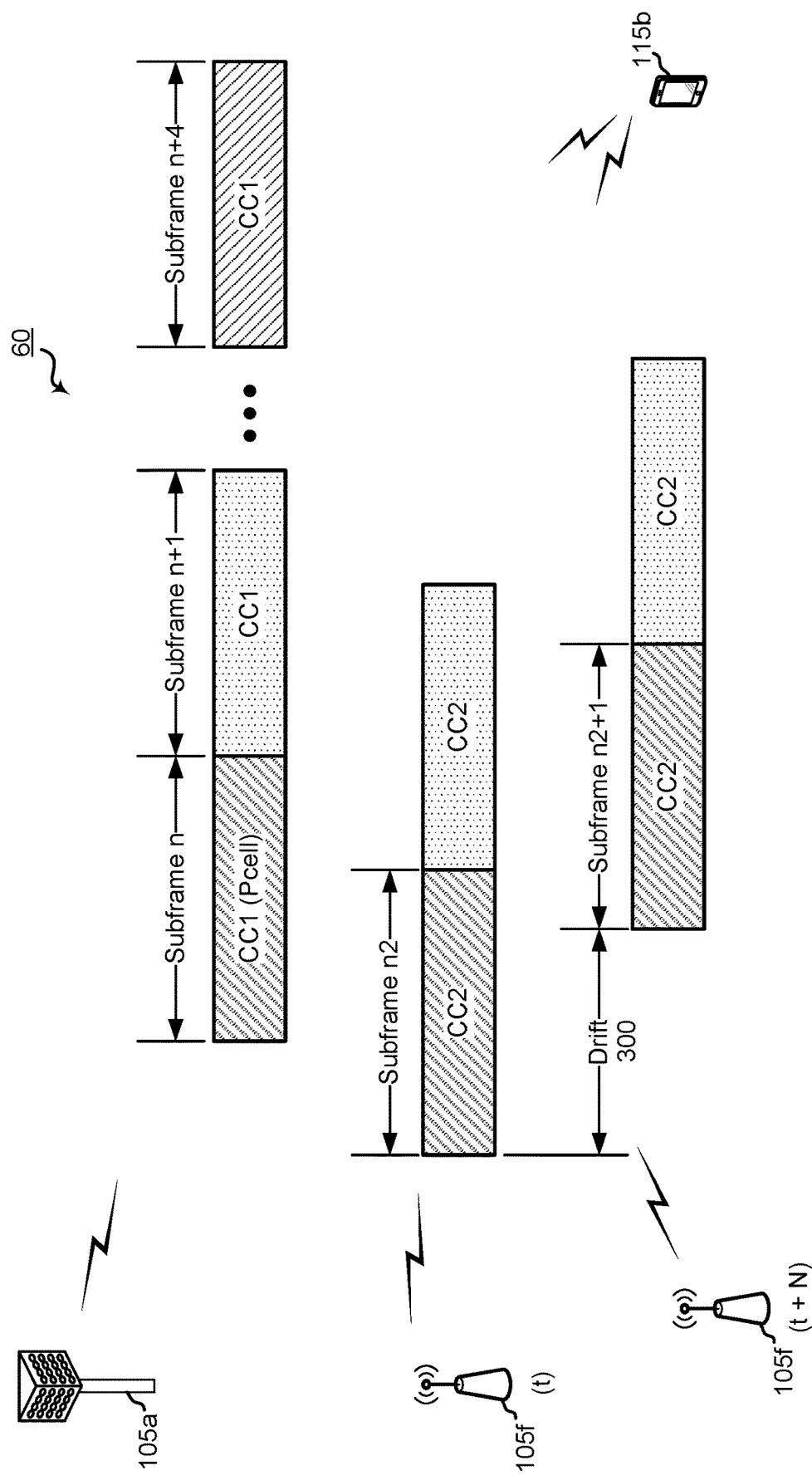
FIG. 6 is a block diagram illustrating an NR network configured according to one aspect of the present disclosure.

FIG. 6 is a block diagram illustrating an NR network 60 configured according to one aspect of the present disclosure. The multi-carrier operations configured in NR network 60 include two CCs, CC1 and CC2, served by base station 105*a* and 105*f*. The asynchronous operation may not only be reflected by CCs that are not synchronous to one another, but may be realized as a result of a drift over time. That is, over time, the timing offset between CC1 and CC2 may change for any variety of reasons (e.g., inaccurate oscillators, different path loss, different transmission timing, etc.). As illustrated, at time, t, the subframe correspondence of CC2 indicates to UE 115*b* that the first illustrated subframe of CC2 corresponds to subframe n of CC1 (subframe n2). However, at time t+N, the timing relationship between CC1 and CC2 has drifted, such that the starting time of subframe n2 is now located after the starting time of subframe n. UE 115*b* may detect such drift 300 and update the subframe correspondence. If subject to a 4 subframe HARQ timing, the drift of CC2 would cause an error with regard to the HARQ feedback for subframe n2. Because the HARQ feedback subframe n+4 would now be less than 4 subframes from subframe n2, UE 115*b* would not be able to properly transmit the acknowledgement of subframe n2 to base station 105*f* where base station 105*f* expects. Thus, when UE 115*b* detects drift 300 has exceeded a predetermined threshold, UE 115*b* may update the subframe correspondence from subframe n2 to subframe n2+1. In general, because of timing drifts between a Pcell or a Scell, a subframe originally identified with a correspondence of subframe n2 in the Scell may be updated to either n2+1 (or n2−1), depending on the drift.

It should be noted that in alternative aspects, signaling from any of the base stations of the multi-carrier operational set may send an indication to a served UE of new subframe correspondence caused by drift. The base station may be triggered to send an update to the correspondence when the drift is detected that exceeds a selected threshold amount. The base station may also send an indication directly to the UE of the detected drift, which the UE may then use to determine the updated subframe correspondence.

Figure 7:
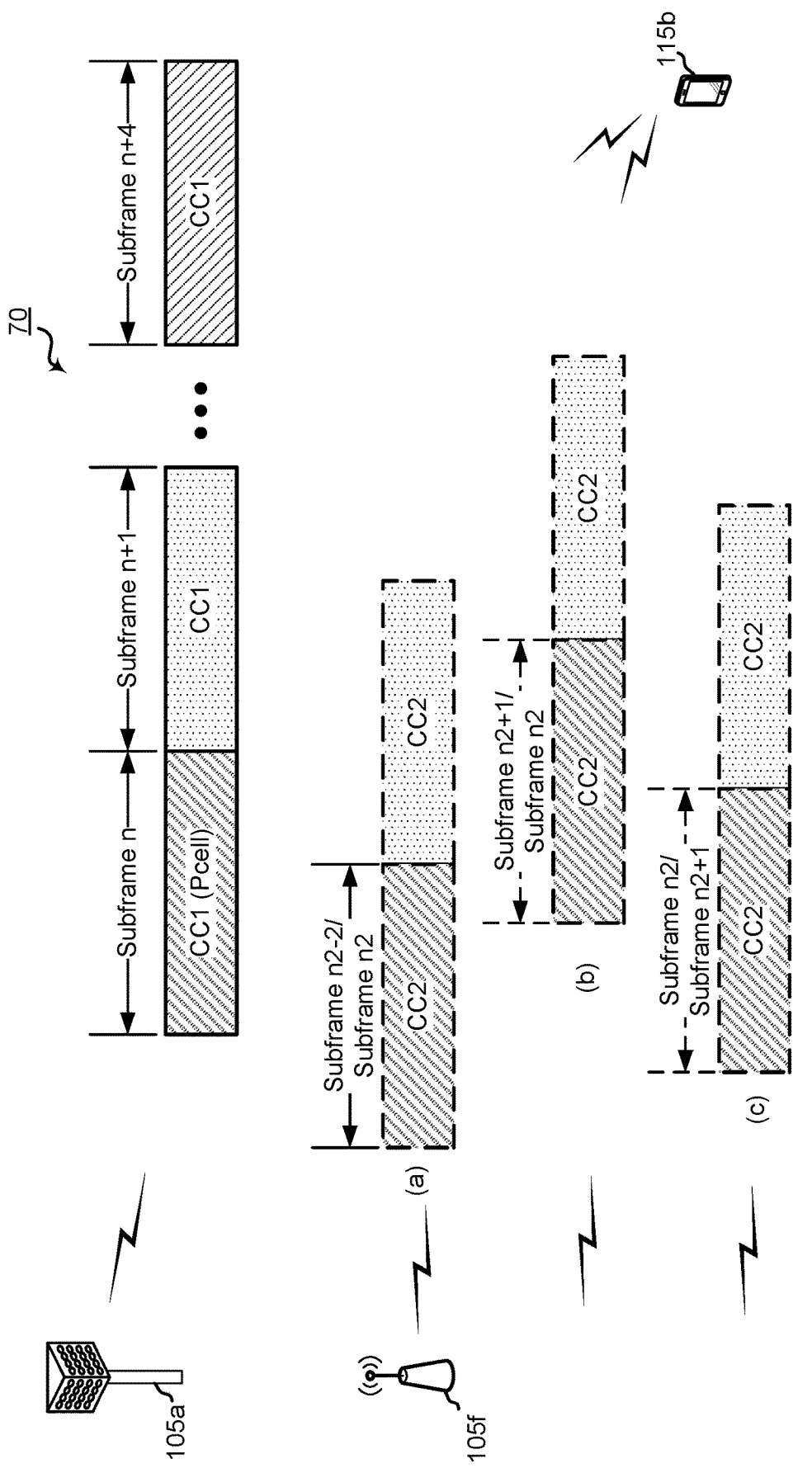
FIG. 7 is a block diagram illustrating an NR network configured according to one aspect of the present disclosure.

FIG. 7 is a block diagram illustrating an NR network 70 configured according to one aspect of the present disclosure. The correspondence of subframes among CCs may also depend on UE capability and UL timing advance (TA) for the set of CCs. The portion of NR network 70 illustrated in FIG. 7 includes base station 105*a*, which serves the Pcell CC1 and base station 105*f*, which serves an Scell CC2. Three variations of the transmission of CC2 are illustrated in FIG. 7. A first option, (a), illustrates the influence of TA for the set of CCs. As illustrated for purposes of the first option (a), UE 115*b* has a shorter uplink TA in CC1 as compared to a longer uplink TA in CC2. Thus, the subframe correspondence of subframe n of CC1 (PUCCH cell) would by subframe n2−2 of CC2. In contrast, when UE 115*b* has a longer uplink TA in CC1 with a smaller uplink TA in CC2, the subframe correspondence to subframe n of CC1 (PUCCH cell) may be subframe n2 of CC2. The TA for the set of CCs is part of the timing offset between the CCs. Thus, the relationship of the TAs between the different CCs may have an effect on the resulting subframe correspondence.

In a second option, (b), the HARQ timing and UE capabilities may influence the subframe correspondence. For example, if UE 115*b* were capable of only an n+4 (4 ms) HARQ timing, the correspondence of subframe n of CC1 (PUCCH cell) would be subframe n2+1 for CC2, with both mapped to PUCCH in subframe n+4 of CC1. Because the HARQ timing of CC2 is 4 ms, the subframe correspondence of a subframe of CC2 starting after the starting time of subframe n of CC1 could not be identified as a subframe n2 and result in an accurate HARQ feedback at n+4. In contrast, if UE 115*b* were capable of an n+3 (3 ms) HARQ timing, the subframe correspondence and the same location illustrated at (b) may be subframe n2 of CC2, with both subframe n of CC1 and subframe n2 of CC2 mapped to PUCCH in subframe n+4 of CC1. Thus, the UE capabilities have an effect on the subframe correspondence.

In a third option, (c), the type of channel processing may influence the subframe correspondence. In a first example of option (c), UE 115*b* is configured with PDCCH. Because PDCCH occurs in the early symbols of the subframe, UE 115*b* may decode the channel early in the subframe. Thus, the subframe correspondence to subframe n of CC1 would be subframe n2 of CC2, as the decoding has finished prior to the starting time of subframe n. However, in a second example of option (c), UE 115*b* is configured for EPDCCH with a UE-specific search space across the entire subframe. Thus, decoding of EPDCCH may not finish until the end of the subframe. In such aspect, the decoding does not finish until after the starting time of subframe n of CC1. Thus, if CC1 and CC2 share the same HARQ timing (e.g., 4 ms), the subframe correspondence would now be subframe n2+1 for CC2.

The correspondence of subframes can also be dependent on whether the scheduling is configured for same-carrier scheduling or cross-carrier scheduling. Referring back to FIG. 5, if same-carrier scheduling is configured, the subframe correspondence can be such that all CCs to the anchor PUCCH CC(s) (e.g., CC1) are configured to have either the same or at least complementary HARQ timing. As illustrated in FIG. 5, same-carrier scheduling would define the control and scheduling for each of CC1-CC3 to be included in control signals transmitted on the corresponding CC. For example, control signals for CC1 would be transmitted via control channels on CC1, while control signals for CC2 would be transmitted via control channels on CC2, and so forth. Thus, for same-carrier scheduling, each CC of the multi-carrier operation set would be configured to have a HARQ timing of at least N ms, where the PUCCH subframe for HARQ feedback is scheduled at subframe n+N (e.g., N=3, or 4 depending on UE capability).

Figure 8:
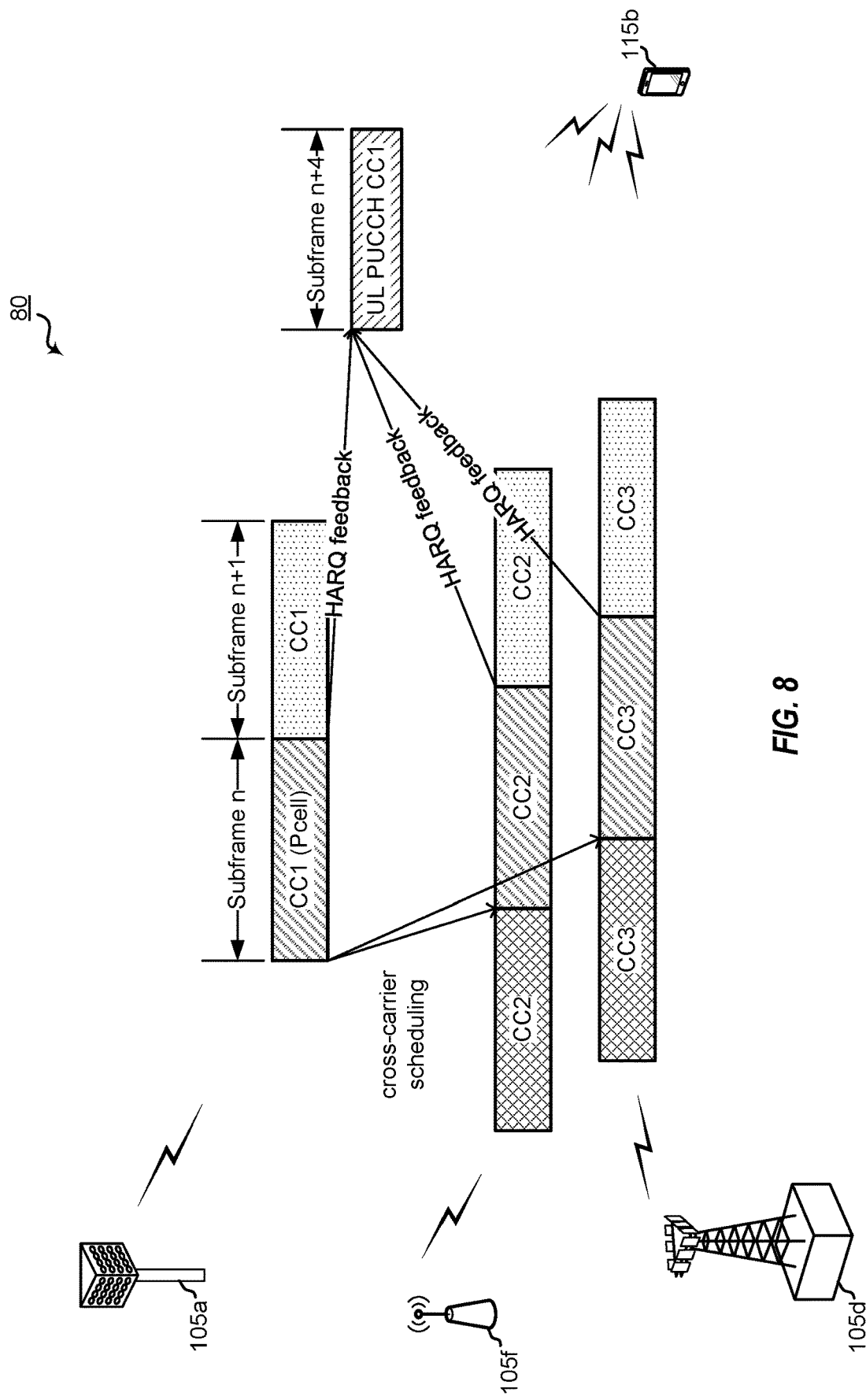
FIG. 8 is a block diagram illustrating an NR network configured according to one aspect of the present disclosure.

FIG. 8 is a block diagram illustrating an NR network 80 configured according to one aspect of the present disclosure. The portion of NR network 80 illustrated in FIG. 8 includes base stations 105a, 105f, and 105d that are a multi-carrier operations set serving CC1-CC3 for communications with UE 115b configured with multi-carrier operations. The multi-carrier operation configured in the illustrated portion of NR network 80 includes cross-carrier scheduling, in which the control and scheduling of each of CC1-CC3 are included in control signals transmitted via one of the CCs (e.g., CC1). Because of the cross-carrier scheduling, the corresponding subframes of CC2 and CC3 would not start until after receipt of the control signals transmitted on CC1. As such, according to the illustrated aspect, there would be a guaranteed causal scheduling timing between the scheduling CC (CC1) and the scheduled CC(s) (CC2 and CC3), along with a minimum HARQ timing for each CC. For example, the Scell CCs, CC2 and CC3, would have the minimum HARQ timing (e.g., 3 ms, 4 ms, etc.) while the Pcell CC, CC1, would have sufficient HARQ timing to guarantee accurate HARQ feedback operations (e.g., 4 ms when the HARQ timing of CC2 and CC3 is 3 ms). Thus, the PUCCH CC (which schedules itself and the other CCs of the multi-carrier operation set) may have a HARQ timing of n+4, while other CCs have a HARQ timing of n+3.

When performing uplink communications between UE 115b and base stations 105a, 105f, and 105d, UE 115b will be configured for at least three uplink CCs. In typical UE operation, when there are two or more uplink CCs transmitted by a UE, power limiting operations are used by the UE to manage the limited power at the UE. The existing standards for dual connectivity include potential handling of uplink asynchronous power limitation schemes for up to two uplink CCs. Aspects of the present disclosure would extend those power limitation schemes to handle three or more uplink CCs configured to a UE, such as UE 115b.

It should be noted that there can still be two asynchronous PUCCH groups, as a UE may be configured with up to two PUCCH groups even when configured with three or more PUSCH CCs, while there are three or more asynchronous PUSCH groups. Various aspects of the present disclosure may provide for a minimum guaranteed power that can be configured for each CC. This minimum guaranteed power may be applicable as a per CC minimum guaranteed channel (e.g., each of CC1, CC2, and CC3 are configured to have the minimum guaranteed power), or as a per channel minimum guaranteed power (e.g., one for PUCCH, the other for PUSCH). The per channel minimum guaranteed power accommodates a configuration where the number of PUCCH groups is different from the number of PUSCH groups.

Figure 9:
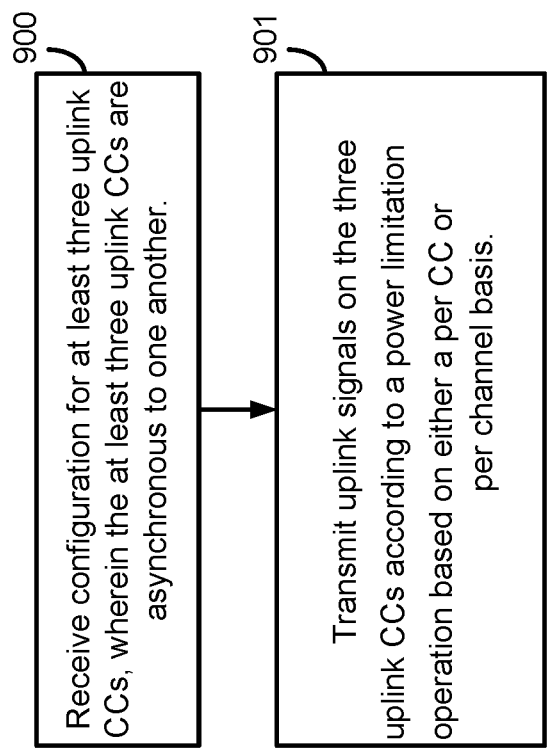
FIG. 9 is a block diagram illustrating example blocks executed to implement one aspect of the present disclosure.

FIG. 9 is a block diagram illustrating example blocks executed to implement one aspect of the present disclosure. At block 900, a UE receives configuration for at least three uplink CCs, wherein the at least three uplink CCs are asynchronous to one another. For example, UE 115b (FIG. 10) receives configuration information via antennas 252a-r and wireless radios 1000a-r.

At block 901, the UE transmits uplink signals on the three uplink CCs according to a power limitation operation based either on a per CC or per channel basis. When configured for at least three uplink CCs, UE 115b, under control of controller/processor 280, executes power scheme 1004, stored in memory 282. The execution environment of power scheme 1004 divides the power for the at least three uplink CCs to provide a guaranteed minimum power either on a per CC or per channel basis.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4 and 9 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, the method comprising:
   detecting, by a user equipment (UE), a multi-carrier operation including a plurality of asynchronous component carriers (CCs), one of the plurality of asynchronous CCs being a reference CC that has at least one subframe; and
   for a respective subframe of the at least one subframe of the reference CC:
   identifying, by the UE, for each respective CC of at least one other CC of the plurality of asynchronous CCs, which one of a plurality of subframes of the respective CC has a communication packet that relates to a communication packet of the respective subframe of the reference CC, and is therefore a corresponding one of the plurality of subframes, conditional, at least in part, on the corresponding one of the plurality of subframes having a start time that is prior to a start time of the respective subframe of the reference CC; and
   for the each respective CC of the at least one other CC, mapping, by the UE, the corresponding one of the plurality of subframes of the respective CC to the respective subframe of the reference CC.

2. The method of claim 1, further comprising:
   identifying a current subframe, n, of the reference CC; and
   identifying, based on a timing offset between the plurality of asynchronous CCs, corresponding subframes of the plurality of asynchronous CCs, wherein a subframe, nk, in the kth CC of the plurality of asynchronous CCs corresponds to subframe n of the reference CC based on subframe nk having a starting time prior to the starting time of subframe n, where k is an index of the plurality of asynchronous CCs.

3. The method of claim 1, wherein the identifying is performed based on one or more of: UE capability, a level of timing advance (TA) associated with each of the plurality of asynchronous CCs, which of a plurality of predefined methods of channel processing is scheduled for each of the plurality of asynchronous CCs, or any combination thereof.

4. The method of claim 1, further including:
   receiving configuration information at the UE for at least three uplink CCs, wherein the at least three uplink CCs are asynchronous to one another; and
   transmitting uplink signals on the at least three uplink CCs according to a power limitation operation, and
   wherein the power limitation operation provides a minimum guaranteed power in accordance with one of:
   per CC of the at least three uplink CCs; and
   per channel of uplink transmissions.

5. The method of claim 1, wherein the mapping is performed such that the communication packet of the respective CC of the at least one other CC of the plurality of asynchronous CCs and the communication packet of the respective subframe of the reference CC are correctly processed correspondingly with each other for carrier aggregation.

6. The method of claim 1, wherein:
   the mapping includes performing carrier aggregation using the corresponding one of the plurality of subframes of the respective CC and the respective subframe of the reference CC;
   all of the at least one other CC of the plurality of asynchronous CCs includes a corresponding subframe of the CC that corresponds to the respective subframe of the reference CC; and
   for the respective subframe of the reference CC, identifying the respective subframe of the reference CC, wherein, for the each respective CC of the at least one other CC of the plurality of asynchronous CCs, the identifying of the corresponding one of the plurality of subframes of the respective CC based on a timing offset between the plurality of asynchronous CCs.

7. The method of claim 1, further comprising determining, based on a timing offset between the plurality of asynchronous CCs, a subframe correspondence relative to the reference CC of the plurality of asynchronous CCs.

8. The method of claim 7, further comprising:
receiving a timing offset indicator identifying a timing offset signaled from one of the one or more serving base stations; or
deriving the timing offset at the UE through analysis of one or more of synchronization signals and physical broadcast signals.

9. An apparatus configured for wireless communication, the apparatus comprising:
a memory; and
at least one processor coupled to memory, the at least one processor is configured to:
detect, by a user equipment (UE), a multi-carrier operation including a plurality of asynchronous component carriers (CCs), one of the plurality of asynchronous CCs being a reference CC that has at least one subframe; and
for a respective subframe of the at least one subframe of the reference CC:
identify, for each respective CC of at least one other CC of the plurality of asynchronous CCs, which one of a plurality of subframes of the respective CC has a communication packet that relates to a communication packet of the respective subframe of the reference CC, and is therefore a corresponding one of the plurality of subframes, conditional, at least in part, on the corresponding one of the plurality of subframes having a start time that is prior to a start time of the respective subframe of the reference CC; and
for the each respective CC of the at least one other CC, map the corresponding one of the plurality of subframes of the respective CC to the respective subframe of the reference CC.

10. The apparatus of claim 9, wherein the at least one processor is configured to:
identify one CC of the plurality of asynchronous CCs as the reference CC based on the identified CC being indicated as a primary cell (PCell) or anchor physical uplink control channel (PUCCH) cell; and
determine a level of timing advance (TA) associated with each of the plurality of asynchronous CCs.

11. The apparatus of claim 9, wherein the identification is based on a channel scheduled for each of the plurality of asynchronous CCs.

12. The apparatus of claim 9, wherein the at least one other CC includes a first asynchronous CC of the plurality of asynchronous CCs, the first asynchronous CC includes a first subframe that corresponds to the subframe of the reference CC, and the first subframe of the first asynchronous CC has a first start time that is prior to the start time of the subframe of the reference CC.

13. The apparatus of claim 12, wherein the at least one other CC includes a second asynchronous CC of the plurality of asynchronous CCs, the second asynchronous CC includes a second subframe that corresponds to the subframe of the reference CC, and the second subframe of the second asynchronous CC has a second start time that is prior to the start time of the subframe of the reference CC.

14. The apparatus of claim 9, wherein the mapping is such that the communication packet that is identified and the communication packet of the respective subframe of the reference CC are correctly processed correspondingly with each other for carrier aggregation.

15. The apparatus of claim 9, wherein the at least one processor is configured to determine, based on a timing offset between the plurality of asynchronous CCs, a subframe correspondence relative to the reference CC of the plurality of asynchronous CCs.

16. The apparatus of claim 15, wherein the at least one processor is configured to:
receive a timing offset indicator identifying the timing offset signaled from a serving base station; or
derive the timing offset at the UE through analysis of one or more of synchronization signals and physical broadcast signals.

17. The apparatus of claim 9, wherein, to perform the mapping, the at least one processor is configured to perform carrier aggregation using the corresponding one of the plurality of subframes of the respective CC and the respective subframe of the reference CC.

18. The apparatus of claim 17, wherein each CC of the plurality of asynchronous CCs other than the reference CC includes a corresponding subframe of the CC that corresponds to the respective subframe of the at least one subframe of the reference CC.

19. The apparatus of claim 17, wherein the at least one processor is configured to:
identify the respective subframe of the at least one subframe of the reference CC; and
for each CC of the at least one other of the plurality of asynchronous CCs having a start time of the corresponding subframe of the CC that is prior to the start time of the respective subframe of the at least one subframe of the reference CC, identify, based on a timing offset between the plurality of asynchronous CCs, the corresponding subframe of the CC that corresponds to the respective subframe of the at least one subframe of the reference CC.

20. The apparatus of claim 17, wherein the at least one processor is configured to set the corresponding one of the plurality of subframes to share a same hybrid automatic repeat request (HARQ) feedback operation as the respective subframe of the reference CC based on, and conditional upon, the corresponding one of the plurality of subframes having the start time that is prior to a start time of the respective subframe of the reference CC.

* * * * *